(12) United States Patent
Yang et al.

(10) Patent No.: US 11,634,148 B2
(45) Date of Patent: Apr. 25, 2023

(54) METHOD, APPARATUS, STORAGE MEDIUM AND ELECTRONIC DEVICE FOR TESTING DYNAMIC PARAMETER OF VEHICLE

(71) Applicant: Baidu Online Network Technology (Beijing) Co., Ltd., Beijing (CN)

(72) Inventors: Fan Yang, Beijing (CN); Fan Zhu, Beijing (CN); Kecheng Xu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/914,644

(22) Filed: Jun. 29, 2020

(65) Prior Publication Data

US 2021/0001872 A1 Jan. 7, 2021

(30) Foreign Application Priority Data

Jul. 1, 2019 (CN) .......................... 201910586829.7

(51) Int. Cl.
*B60W 60/00* (2020.01)
*B60W 50/04* (2006.01)
(Continued)

(52) U.S. Cl.
CPC .......... *B60W 50/045* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| 10,343,685 | B2 | 7/2019 | Zhu et al. |
| 2005/0190049 | A1 | 9/2005 | Kuchler |

(Continued)

FOREIGN PATENT DOCUMENTS

| CN | 102902252 A | 1/2013 |
| CN | 103852264 A | 6/2014 |

(Continued)

OTHER PUBLICATIONS

Extended European Search Report for European Patent Application No. 20166329.1 dated Sep. 9, 2020.
(Continued)

*Primary Examiner* — James M McPherson
(74) *Attorney, Agent, or Firm* — Harness, Dickey & Pierce, P.L.C.

(57) ABSTRACT

A method, an apparatus, a storage medium, and an electronic device for testing dynamic parameter of vehicle are provided. The method for testing dynamic parameter of vehicle provided by the present disclosure includes: first obtaining a control parameter for an autonomous vehicle; then controlling the vehicle to travel automatically under a given environment according to the control parameter, detecting and recording traveling data of the vehicle; and at last determining a dynamic parameter of the vehicle according to the traveling data. According to the method for testing dynamic parameter provided by the present disclosure, the characteristic of automatic driving of an autonomous vehicle is utilized to achieve an automatic measurement of the dynamic parameter, thereby reducing cost for calibrating the vehicle and significantly improving safety during the test. Additionally, human error caused by manually driving during the test can be avoided effectively.

13 Claims, 3 Drawing Sheets

(51) Int. Cl.
  *B60W 10/18* (2012.01)
  *B60W 10/20* (2006.01)
  *B60W 50/06* (2006.01)

(52) U.S. Cl.
  CPC .......... *B60W 50/06* (2013.01); *B60W 60/001* (2020.02); *B60W 2520/00* (2013.01); *B60W 2540/18* (2013.01)

(56) References Cited

U.S. PATENT DOCUMENTS

| | | | |
|---|---|---|---|
| 2018/0088582 A1 | 3/2018 | Kong et al. | |
| 2018/0164810 A1 | 6/2018 | Luo et al. | |
| 2019/0361436 A1 | 11/2019 | Ueda et al. | |
| 2020/0207412 A1* | 7/2020 | Al Assad | E01C 7/356 |

FOREIGN PATENT DOCUMENTS

| | | |
|---|---|---|
| CN | 106289797 A | 1/2017 |
| CN | 106682353 A | 5/2017 |
| CN | 107843440 A | 3/2018 |
| CN | 108088686 A | 5/2018 |
| CN | 207676388 U | 7/2018 |
| CN | 109435952 A | 3/2019 |
| CN | 109522673 A | 3/2019 |
| JP | 2019500256 A | 1/2019 |
| WO | 2018/155159 A1 | 8/2018 |

OTHER PUBLICATIONS

First Office Action of corresponding Japanese application No. 2020-110584, dated Jun. 15, 2021, five pages.
Gaodeng Jiegou Donglixue, "Chapter 5 Modification of the Structural Dynamics Model," Hunan University Bosch Automotive Handbook (5th Edition); Beijing Institute of Technology Press; May 4, 2014; http://www.crnrd.net/dejournals/#/cmfd/ctablelist (33 pages).
China Office Aciton dated Jul. 11, 2022 for corresponding China Application No. CN201910586829.7. (27 pages).
China Office Action dated Jul. 11, 2022 for corresponding Chinese application No. 201910586829.7 with English Translation. (16 pages).
Advanced structural dynamics by Erming HE et al., published on Nov. 30, 2016 with English Translation (5 pages).
Simulation analysis of vehicle dynamics model with 14 degrees of freedom by Ruilei Yan, published on Apr. 30, 2015 with English Translation (7 pages).
BOSCH Automotive Handbook translationed by Boliang GU, pulished on Jan. 31, 2004 with English Translation (6 pages).
Research on Modeling and Evaluation of Vehicle Dynamics for Hardware-in-the-loop Simulation by Bo Wang, published on Mar. 31, 2018 with English translation (15 pages).
Office Action in corresponding Chinese Patent Application No. 201910586829.7 dated Nov. 24, 2022.
Zhu, Tianjun, "Research on Improved TTR Rollover Dynamic Warning and Multi-objective Stability Control Algorithm of Heavy Duty Vehicle", China Academic Journal Electronic Publishing House, Jun. 2010.

* cited by examiner

METHOD, APPARATUS, STORAGE MEDIUM AND ELECTRONIC DEVICE FOR TESTING DYNAMIC PARAMETER OF VEHICLE

CROSS-REFERENCE TO RELATED APPLICATIONS

This application claims priority to Chinese Patent Application No. 201910586829.7, filed on Jul. 1, 2019, which is hereby incorporated by reference in its entirety.

TECHNICAL FIELD

The present disclosure relates to the technical field of automobile test, and in particular, to a method, an apparatus, a storage medium, and an electronic device for testing dynamic parameter of vehicle.

BACKGROUND

During developing and testing a vehicle, a calibration of the full vehicle is needed. In order to make the vehicle have a good dynamic performance, it is particularly important to calibrate a dynamic model of the vehicle accurately.

The premise of accurate calibration of the dynamic model of the vehicle is required to obtain a dynamic parameter of the vehicle under various and different working conditions. In the prior art, for test of the dynamic parameter of the vehicle, the form of manually measuring are mostly taken, where the vehicle is driven by a man to record traveling data, on which the calculation of the dynamic parameter is based. For example, when calibrating a dynamic model of a vehicle, it is necessary to manually measure a friction coefficient of the vehicle at different speeds. During testing the friction coefficient, a driver needs to drive the vehicle slowly from a low speed to a high speed, or even an extreme speed, so that traveling data may be recorded by a relevant recording equipment during the manual acceleration process and then analyzed and calculated by an engineer to obtain the dynamic parameter.

However, test data required in the calibration process also includes the dynamic parameter of the vehicle under an extreme condition; therefore, manual measurements need to be performed by highly professional personnel, which is costly and prone to danger.

SUMMARY

The present disclosure provides a method, an apparatus, a storage medium, and an electronic device for testing dynamic parameter of vehicle to achieve an automatic measurement of a dynamic parameter by utilizing the characteristic of automatic driving of an autonomous vehicle, thereby reducing cost for calibrating the vehicle and improving safety during the test.

In a first aspect, the present disclosure provides a method for testing dynamic parameter of vehicle, including:

obtaining a control parameter for an autonomous vehicle;

controlling the vehicle to travel under a given environment according to the control parameter, detecting and recording traveling data of the vehicle; and determining a dynamic parameter of the vehicle according to the traveling data.

In a possible design, after the determining a dynamic parameter of the vehicle according to the traveling data, the method further comprises:

calibrating a vehicle dynamic model of the vehicle according to the dynamic parameter.

In a possible design, the control parameter comprise at least one of the following types of parameters: dynamic control parameter, direction control parameter, and brake control parameter.

In a possible design, the obtaining a control parameter for an autonomous vehicle comprises:

selecting parameter values of at least two types of parameters from preset dynamic control parameter, preset direction control parameter, and preset brake control parameter as the control parameter for the vehicle.

In a possible design, the traveling data comprises at least one of the following:

driving speed of the vehicle, steering wheel angle of the vehicle, location information of the vehicle, temperature data of the vehicle, and tire data of the vehicle.

In a possible design, the detecting traveling data of the vehicle comprises:

receiving data transmitted from different types of sensors that are set on the vehicle to obtain the traveling data.

In a second aspect, the present disclosure further provides an apparatus for testing dynamic parameter of vehicle, including:

an obtaining module, configured to obtain a control parameter for an autonomous vehicle;

a detecting module, configured to control the vehicle to travel under a given environment according to the control parameter, and detect and record traveling data of the vehicle; and a processing module, configured to determine a dynamic parameter of the vehicle according to the traveling data.

In a possible design, the apparatus further includes:

a calibration module, configured to calibrate a vehicle dynamic model of the vehicle according to the dynamic parameter.

In a possible design, the control parameter comprise at least one of the following types of parameters: dynamic control parameter, direction control parameter, and brake control parameter.

In a possible design, the obtaining module is specifically configured to:

select parameter values of at least two types of parameters from preset dynamic control parameter, preset direction control parameter, and preset brake control parameter as the control parameter for the vehicle.

In a possible design, the traveling data includes at least one of the following:

driving speed of the vehicle, steering wheel angle of the vehicle, location information of the vehicle, temperature data of the vehicle, and tire data of the vehicle.

In a possible design, the detecting module is specifically configured to:

receive data transmitted from different types of sensors that are set on the vehicle to obtain the traveling data.

In a third aspect, the present disclosure further provides a vehicle, including any possible apparatus for testing dynamic parameter of vehicle according to the second aspect.

In a fourth aspect, the present disclosure further provides a computer readable storage medium having a computer program stored thereon, when the computer program is executed by a processor, the processor is caused to implement any possible method for testing a dynamic parameter of a vehicle according to the first aspect.

In a fifth aspect, the present disclosure further provides an electronic device, including:

a processors; and a memory for storing an instruction executable by the processor;

where the processor is configured to perform any possible method for testing a dynamic parameter of a vehicle according to the first aspect by executing the executable instruction.

The present disclosure provides a method, an apparatus, a storage medium, and an electronic device for testing dynamic parameter of vehicle, where a control parameter is obtained for an autonomous vehicle, and then the vehicle is controlled to travel automatically under a given environment according to the control parameter, meanwhile, traveling data of the vehicle is detected and recorded, at last, a dynamic parameter of the vehicle is determined according to the traveling data. In this way, the characteristic of automatic driving of an autonomous vehicle is utilized to achieve an automatic measurement of the dynamic parameter, thereby reducing cost for calibrating the vehicle and significantly improving safety during the test. Additionally, human error caused by manually driving during the test can be avoided effectively.

BRIEF DESCRIPTION OF DRAWINGS

In order to illustrate technical solutions of embodiments of the present disclosure or of the prior art clearly, the drawings used in the description of the embodiments or the prior art will be briefly introduced below. It is apparent that the drawings in the following description are some embodiments of the present disclosure, for those of ordinary skill in the art, other drawings can be obtained based on these drawings without paying any creative efforts.

DESCRIPTION OF EMBODIMENTS

In order to make objectives, technical solutions, and advantages of the embodiments of the present disclosure clearer, the technical solutions of the embodiments of the present disclosure will be clearly and thoroughly described with reference to the accompanying drawings of the embodiments of the present disclosure. It is apparent that the described embodiments is a part, but not all, of the embodiments of the present disclosure. All other embodiments obtained based on the embodiments of the present disclosure by those of ordinary skill in the art without paying any creative efforts shall fall within the protection scope of the present disclosure.

The terms "first", "second", "third", "fourth", and the like (if present) in the description and claims of the present disclosure and the above-mentioned drawings are used to distinguish similar objects, which are not necessarily used for describing a specific order or sequence. It should be understood that such used data are interchangeable where appropriate, so that the embodiments of the present disclosure described herein can be implemented in an order other than those illustrated or described herein. Furthermore, the terms "including" and "containing" and any of their variations are intended to cover non-exclusive inclusions. For example, a process, a method, a system, a product, or a device that includes a series of steps or units is not necessarily limited to those explicitly listed steps or units; instead, it may include other steps or units that are not listed explicitly or are inherent to these processes, methods, products or equipment.

Figure 1:
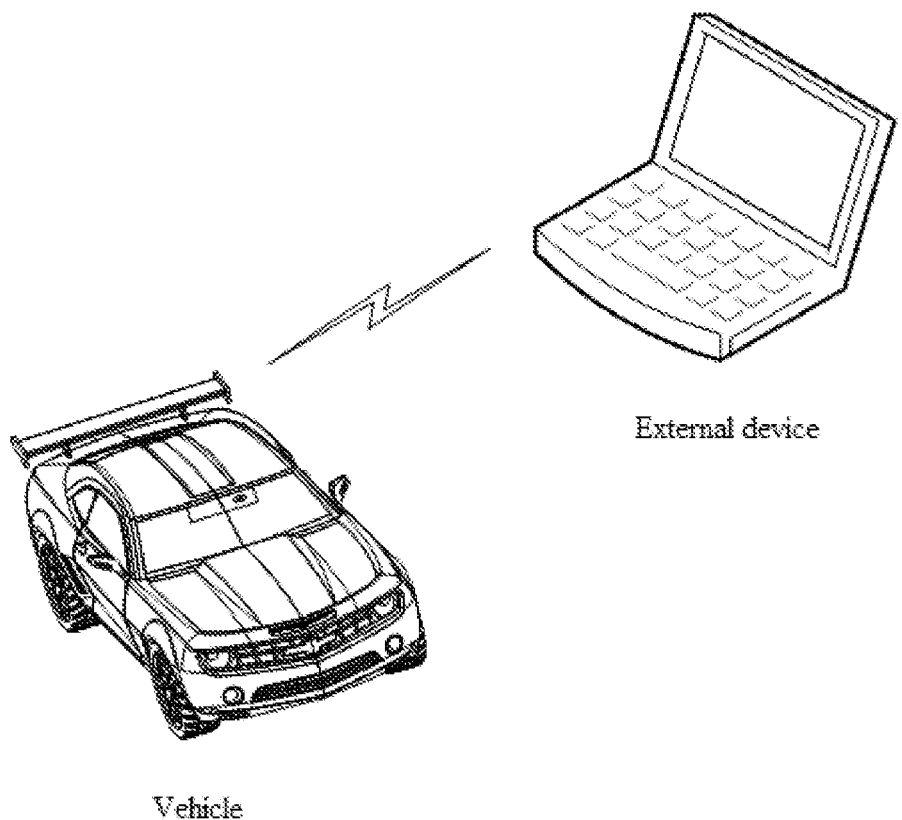
FIG. 1 is an application scenario diagram of a method for testing a dynamic parameter of a vehicle shown according to an exemplary embodiment.

FIG. 1 is an application scenario diagram of a method for testing a dynamic parameter of a vehicle shown according to an exemplary embodiment. As shown in FIG. 1, the method for testing a dynamic parameter of a vehicle provided in the embodiment is applied to a vehicle with a function of automatic driving. In order to collect data for the vehicle and possibly calibrate write data, an external device may also be connected for monitoring and inputting.

The premise of accurate calibration of the dynamic model of the vehicle is required to obtain a dynamic parameter of the vehicle under various and different working conditions. In the prior art, for test of the dynamic parameter of the vehicle, the form of manually measuring are mostly taken, where the vehicle is driven by a man to record traveling data, on which the calculation of the dynamic parameter is based. In a manually test process, it is often necessary to drive the vehicle to a limit state, and then obtain a parameter of the vehicle in various states. Such test process is extremely dependent on professional drivers. There are also greater risks in the test process, such as rollovers, crashes, and skidding, etc.

In view of the above problems, the embodiments of the present disclosure provide a method, an apparatus, a storage medium, and an electronic device for testing a dynamic parameter of a vehicle, where a control parameter is obtained for an autonomous vehicle, and then the vehicle is controlled to travel under a given environment according to the control parameter, meanwhile, traveling data of the vehicle is detected and recorded, at last, a dynamic parameter of the vehicle is determined according to the traveling data. In this way, the characteristic of automatic driving of an autonomous vehicle is utilized to achieve an automatic measurement of the dynamic parameter, thereby reducing cost for calibrating the vehicle and significantly improving safety during the test. Additionally, human error caused by manually driving during the test can be avoided effectively.

The following describes the method for testing a dynamic parameter of a vehicle in detail with reference to several specific implementations.

Figure 2:
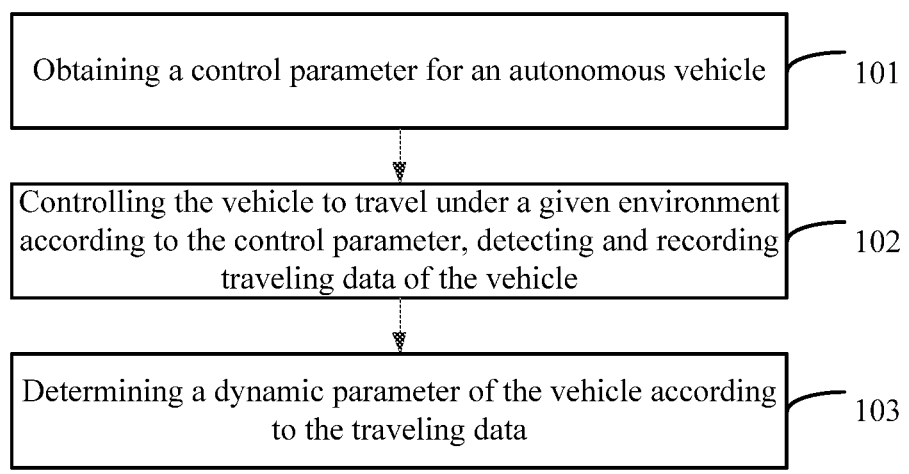
FIG. 2 is a schematic flowchart of a method for testing a dynamic parameter of a vehicle shown according to an exemplary embodiment.

FIG. 2 is a schematic flowchart of a method for testing a dynamic parameter of a vehicle shown according to an exemplary embodiment. As shown in FIG. 2, the method for testing a dynamic parameter provided in this embodiment includes:

Step 101: obtaining a control parameter for an autonomous vehicle.

Specifically, in a test environment, an autonomous vehicle may be controlled automatically by obtaining a control parameter for the autonomous vehicle.

It should be noted that, in this embodiment, the foregoing control parameter may include at least one of the following parameters: dynamic control parameter, direction control parameter, and brake control parameter. Specifically, for the dynamic control parameter, it may include engine revolution, transmission gear, current engine output torque and the like. For the direction control parameter, it may include steering wheel angle, steering wheel rotation speed, steering wheel rotation acceleration and the like. Furthermore, for the brake control parameter, it may include braking time, braking force, and so on.

For example, when obtaining a relevant dynamic parameter about vehicle side slip by the vehicle, the autonomous vehicle may be controlled to accelerate gradually. When a sensor learns that the vehicle is about to experience side slip, current traveling data of the vehicle is recorded. The sensing technology for occurring side slip is common technology in the prior art, which is not repeated in this embodiment.

In addition, in order to have a wider range of adjustability in testing a dynamic parameter of an autonomous vehicles, the above mentioned control parameter can be arbitrarily combined to traverse various kinds of test conditions, thereby outputting a more reliable and comprehensive test result. Specifically, obtaining a control parameter for an autonomous vehicle may include: selecting parameter values of at least two types of parameters from preset dynamic control parameter, preset direction control parameter, and preset brake control parameter as the control parameter for the vehicle. For example, the dynamic control parameter may be fixed, while the direction control parameter and the brake control parameter are combined arbitrarily for the test; or the direction control parameter may be fixed, while the dynamic control parameter and the brake control parameter are combined arbitrarily for the test; or the brake control parameter may be fixed, while the dynamic control parameter and the direction control parameter are combined arbitrarily for the test; in this way, various kinds of testing conditions can be traversed.

Step 102: controlling the vehicle to travel under a given environment according to the control parameter, detecting and recording traveling data of the vehicle.

Specifically, the vehicle is controlled to travel under a given environment according to the control parameter, and the traveling data of the vehicle is detected and recorded.

The detection of the traveling data of the vehicle may be performed by a set sensor thereon. Specifically, the detecting the traveling data of the vehicle includes: receiving data transmitted from different types of sensors that are set on the vehicle to obtain the traveling data.

For example, the detection of the vehicle side slip can be achieved through a detection manner with an Electronic Stability Program (ESP). The ESP system is comprised of a control unit, a steering sensor (to monitor a steering angle of a steering wheel), a wheel sensor (to monitor a rotation speed of each wheel), a side slip sensor (to monitor the state that the vehicle body rotates about the vertical axis), a lateral acceleration sensor (to monitor a centrifugal force when the vehicle turns), etc., the control unit determines the operation state of the vehicle through signals from these sensors.

The traveling data of the vehicle may be stored by a storage device of the autonomous vehicle itself, or may be stored and displayed by an external device. Specific recording process is not limited in this embodiment.

And the traveling data includes at least one of the following: driving speed of the vehicle, steering wheel angle of the vehicle, location information of the vehicle, temperature data of the vehicle, and tire data of the vehicle. It is worth noting that specific data included in the traveling data is not limited in this embodiment, which may be adaptively adjusted according to specific test items.

Step 103: determine a dynamic parameter of the vehicle according to the traveling data.

After the vehicle is controlled to travel under the given environment according to the control parameter, and the traveling data of the vehicle is detected and recorded, the dynamic parameter of a vehicle can be determined according to the traveling data. The determination of the dynamic parameter of the vehicle according to the traveling data may be the same as a data processing part that is performed after a manual test, which is a common technology in the existing vehicle testing process. Methods and steps for processing the traveling data are not specifically limited in this embodiment.

In this embodiment, a control parameter is obtained for an autonomous vehicle, and then the vehicle is controlled to travel automatically under a given environment according to the control parameter, meanwhile, traveling data of the vehicle is detected and recorded, at last, a dynamic parameter of the vehicle is determined according to the traveling data. In this way, the characteristic of automatic driving of an autonomous vehicle is utilized to achieve an automatic measurement of the dynamic parameter, thereby reducing cost for calibrating the vehicle and significantly improving safety during the test. Additionally, human error caused by manually driving during the test can be avoided effectively.

Figure 3:
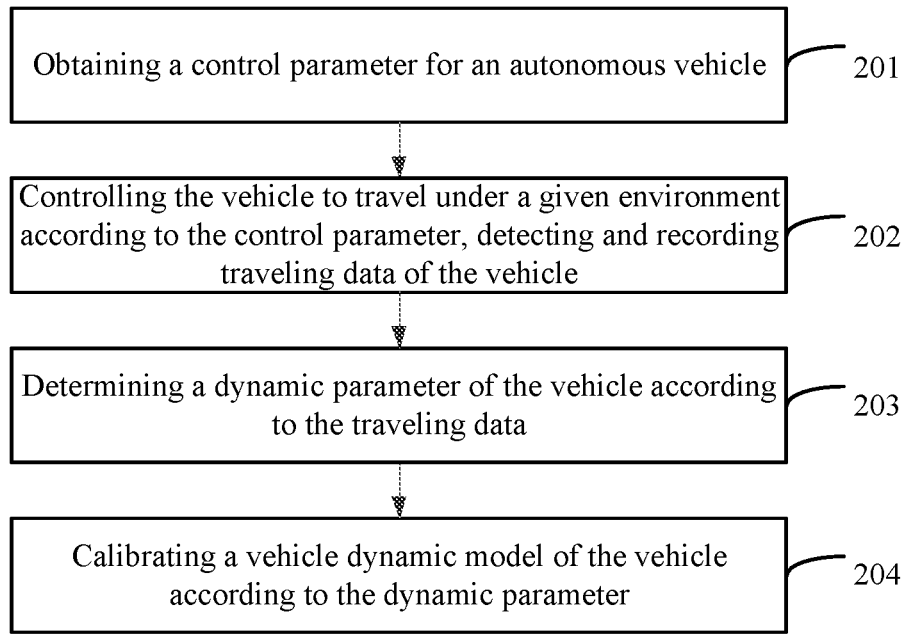
FIG. 3 is a schematic flowchart of a method for testing a dynamic parameter of a vehicle shown according to another exemplary embodiment.

FIG. 3 is a schematic flowchart of a method for testing a dynamic parameter of a vehicle shown according to another exemplary embodiment. As shown in FIG. 3, the method for testing a dynamic parameter provided in this embodiment includes:

Step 201: obtaining a control parameter for an autonomous vehicle.

Specifically, in a test environment, an autonomous vehicle may be controlled automatically by obtaining a control parameter for the autonomous vehicle.

It should be noted that, in this embodiment, the foregoing control parameter may include at least one of the following parameters: dynamic control parameter, direction control parameter, and brake control parameter. Specifically, for the dynamic control parameter, it may include engine revolution, transmission gear, current engine output torque and the like. For the direction control parameter, it may include steering wheel angle, steering wheel rotation speed, steering wheel rotation acceleration and the like. Furthermore, for the brake control parameter, it may include braking time, braking force, and so on.

For example, during obtaining a relevant dynamic parameter about vehicle side slip, the autonomous vehicle may be controlled to accelerate gradually, current traveling data of the vehicle is recorded when a sensor learns that the vehicle is about to experience side slip. The sensing technology for occurring side slip is common technology in the prior art, which is not repeated in this embodiment.

In addition, in order to have a wider range of adjustability in testing a dynamic parameter of an autonomous vehicles, the above mentioned control parameter can be arbitrarily combined to traverse various kinds of test conditions, thereby outputting a more reliable and comprehensive test result. Specifically, obtaining a control parameter for an autonomous vehicle may include: selecting parameter values of at least two types of parameters from preset dynamic control parameter, preset direction control parameter, and preset brake control parameter as the control parameter for the vehicle. For example, the dynamic control parameter may be fixed, while the direction control parameter and the brake control parameter are combined arbitrarily for the test; or the direction control parameter may be fixed, while the dynamic control parameter and the brake control parameter are combined arbitrarily for the test; or the brake control parameter may be fixed, while the dynamic control parameter and the direction control parameter are combined arbitrarily for the test; in this way, various kinds of testing conditions can be traversed.

Step 202: controlling the vehicle to travel under a given environment according to the control parameter, detecting and recording traveling data of the vehicle.

Specifically, the vehicle is controlled to travel under a given environment according to the control parameter, and the traveling data of the vehicle is detected and recorded.

The detection of the traveling data of the vehicle may be performed by a set sensor thereon. Specifically, the detecting the traveling data of the vehicle includes: receiving data transmitted from different types of sensors that are set on the vehicle to obtain the traveling data.

For example, the detection of the vehicle side slip can be achieved through a detection manner with an Electronic Stability Program (ESP). The ESP system is comprised of a control unit, a steering sensor (to monitor a steering angle of a steering wheel), a wheel sensor (to monitor a rotation speed of each wheel), a side slip sensor (to monitor the state that the vehicle body rotates about the vertical axis), a lateral acceleration sensor (to monitor a centrifugal force when the vehicle turns), etc., the control unit determines the operation state of the vehicle through signals from these sensors.

The traveling data of the vehicle may be stored by a storage device of the autonomous vehicle itself, or may be stored and displayed by an external device. Specific recording process is not limited in this embodiment.

And the traveling data includes at least one of the following: driving speed of the vehicle, steering wheel angle of the vehicle, location information of the vehicle, temperature data of the vehicle, and tire data of the vehicle. It is worth noting that specific data included in the traveling data is not limited in this embodiment, which may be adaptively adjusted according to specific test items.

Step 203: determine a dynamic parameter of the vehicle according to the traveling data.

After the vehicle is controlled to travel under the given environment according to the control parameter, and the traveling data of the vehicle is detected and recorded, the dynamic parameter of a vehicle can be determined according to the traveling data. The determination of the dynamic parameter of the vehicle according to the traveling data may be the same as a data processing part that is performed after a manual test, which is a common technology in the existing vehicle testing process. Methods and steps for processing the traveling data are not specifically limited in this embodiment.

Step 204: calibrating a vehicle dynamic model of the vehicle according to the dynamic parameter.

Specifically, after the determining a dynamic parameter of the vehicle according to the traveling data, the method further includes: calibrating a vehicle dynamic model of the vehicle according to the determined dynamic parameter.

Specifically, by providing enough kinds of environment (for example, in terms of friction gradient characteristic) in a sufficiently large empty field, using autonomous driving to gradually explore from slow to fast, test results with great accuracy can be obtained under various states on the premise that the safety is ensured, various dynamic parameters can be determined to establish a dynamic model of the vehicle.

Figure 4:
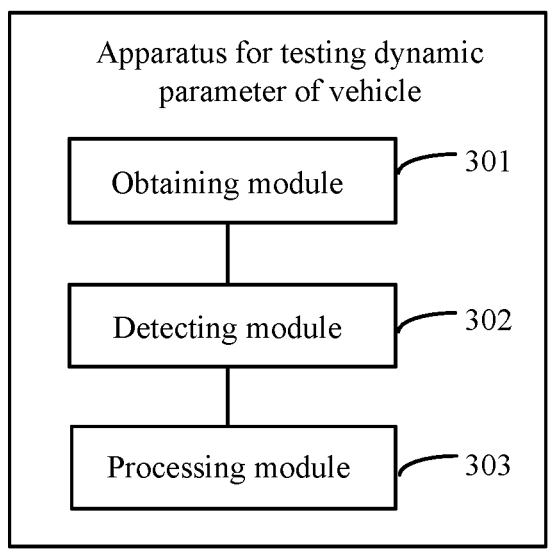
FIG. 4 is a schematic structural diagram of an apparatus for testing a dynamic parameter of a vehicle shown according to an exemplary embodiment.

FIG. 4 is a schematic structural diagram of an apparatus for testing a dynamic parameter of a vehicle shown according to an exemplary embodiment. As shown in FIG. 4, the apparatus for testing a dynamic parameter of a vehicle provided in this embodiment includes:

an obtaining module 301, configured to obtain a control parameter for an autonomous vehicle;

a detecting module 302, configured to control the vehicle to travel under a given environment according to the control parameter, and detect and record traveling data of the vehicle;

a processing module 303, configured to determine a dynamic parameter of the vehicle according to the traveling data.

In this embodiment, a control parameter is obtained for an autonomous vehicle, and then the vehicle is controlled to travel automatically under a given environment according to the control parameter, meanwhile, traveling data of the vehicle is detected and recorded, at last, a dynamic parameter of the vehicle is determined according to the traveling data. In this way, the characteristic of automatic driving of an autonomous vehicle is utilized to achieve an automatic measurement of the dynamic parameter, thereby reducing cost for calibrating the vehicle and significantly improving safety during the test. Additionally, human error caused by manually driving during the test can be avoided effectively.

Figure 5:
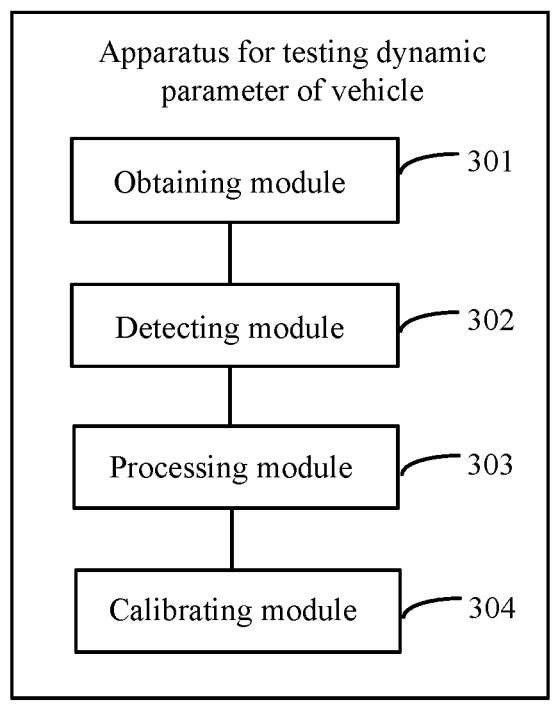
FIG. 5 is a schematic structural diagram of an apparatus for testing a dynamic parameter of a vehicle shown according to another exemplary embodiment.

Based on the embodiment shown in FIG. 4, FIG. 5 is a schematic structural diagram of an apparatus for testing a dynamic parameter of a vehicle shown according to another exemplary embodiment. As shown in FIG. 5, the apparatus for testing a dynamic parameter of a vehicle provided in this embodiment further includes:

a calibration module 304, configured to calibrate a vehicle dynamic model of the vehicle according to the dynamic parameter.

In a possible design, the control parameter comprise at least one of the following types of parameters: dynamic control parameter, direction control parameter, and brake control parameter.

In a possible design, the obtaining module 301 is specifically configured to:

select parameter values of at least two types of parameters from preset dynamic control parameter, preset direction control parameter, and preset brake control parameter as the control parameter for the vehicle.

In a possible design, the traveling data includes at least one of the following:

driving speed of the vehicle, steering wheel angle of the vehicle, location information of the vehicle, temperature data of the vehicle, and tire data of the vehicle.

In a possible design, the detecting module 302 is specifically configured to receive data transmitted from different types of sensors that are set on the vehicle to obtain the traveling data.

The above processing module 303 may be configured as one or more integrated circuits to implement the above method, for example: one or more application specific integrated circuits (ASICs), or one or more digital signal processor (DSP), or one or more field programmable gate array (FPGA), and the like. As another example, when one of the above modules is implemented in the form that a processing element schedules a program code, the processing element may be a general purpose processor, such as a central processing unit (CPU) or other processors that can call a program code. As yet another example, these modules can be integrated together and implemented in the form of a system-on-a-chip (SOC).

In addition, each functional unit in each embodiment of the present disclosure may be integrated into one processing unit, or each unit may physically exist separately, or two or more units may be integrated into one unit. The above integrated unit may be implemented in the form of hardware, or in the form of hardware plus software functional unit.

It is worth noting that the apparatus for testing a dynamic parameter of a vehicle in the embodiment shown in FIG. 4 to FIG. 5 can be used to execute the method in the embodiment shown in FIG. 2 to FIG. 3. The specific implementation manners and technical effects are similar, which are not repeated herein.

In another aspect, the present disclosure provides a vehicle, including the apparatus for testing a dynamic parameter of a vehicle according to the embodiments shown in FIG. 4 to FIG. 5.

The present disclosure further provides a computer readable storage medium having a computer program stored thereon, when the computer program is executed by a processor, the processor is caused to implement the technical solution according to any one of the foregoing method embodiments, where the implementation principles and technical effects are similar, which are not repeated herein.

Figure 6:
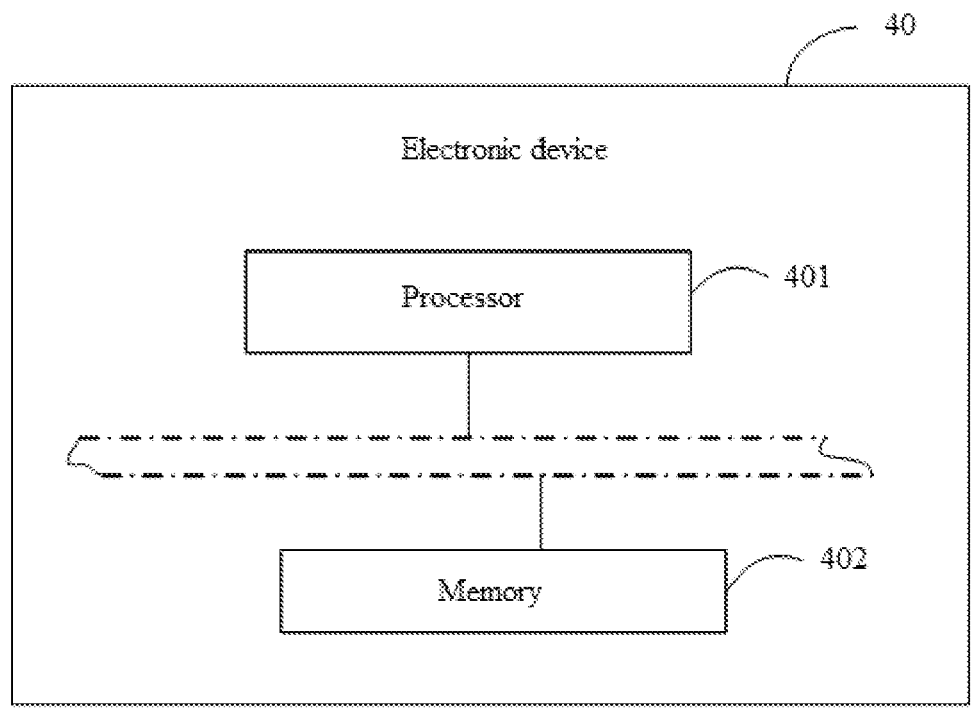
FIG. 6 is a schematic structural diagram of an electronic device shown according to an exemplary embodiment.

FIG. 6 is a schematic structural diagram of an electronic device according to an exemplary embodiment. As shown in FIG. 6, the electronic device 40 provided in this embodiment includes:

a processor 401;

a memory 402 for storing an executable instruction for the processor;

the processor 401 is configured to implement the method for testing dynamic parameter of vehicle provided by any one of the foregoing method embodiments by executing the executable instruction.

The processor 401 is configured to execute the technical solution described in any one of the foregoing method embodiments by executing the executable instruction. The implementation principles and technical effects are similar, and details are not repeated herein.

At last, it should be noted that the above embodiments are merely used to illustrate the technical solutions of the present disclosure, but not limited thereto. Although the present disclosure has been described in detail with reference to the foregoing embodiments, those skilled in the art should understand that the technical solutions described in the foregoing embodiments can be modified, or that some or all of the technical features can be replaced with equivalents, and these modifications or replacements do not deviate the essence of the corresponding technical solutions from the range of the technical solutions of the embodiments of the present disclosure

What is claimed is:

1. Method for testing multiple dynamic parameters of a vehicle under various and different working conditions during developing and testing of a full vehicle, comprising:
    obtaining multiple control parameters for an autonomous vehicle, wherein the multiple control parameters comprise a dynamic control parameter, a direction control parameter, and a brake control parameter, and wherein the dynamic control parameter comprises an engine revolution, a transmission gear, and a current engine output torque, the direction control parameter comprises a steering wheel angle, a steering wheel rotation speed, and a steering wheel rotation acceleration, and the brake control parameter comprises a braking time, and a braking force;
    controlling the vehicle to travel under various kinds of test conditions according to the multiple control parameters, detecting and recording multiple traveling data of the vehicle; and
    determining multiple dynamic parameters of the vehicle according to the multiple traveling data;
    wherein the obtaining multiple control parameters for an autonomous vehicle comprises:
    obtaining multiple combinations of control parameters according to the multiple control parameters for the autonomous vehicle, wherein the multiple combinations of control parameters comprises a combination of the direction control parameter and the brake control parameter with fixed dynamic control parameter, a combination of the dynamic control parameter and the brake control parameter with fixed direction control parameter, and a combination of the dynamic control parameter and the direction control parameter with fixed brake control parameter;
    wherein the controlling the vehicle to travel under various kinds of test conditions according to the multiple control parameters, detecting and recording multiple traveling data of the vehicle comprises:
    controlling the vehicle to travel under various kinds of test conditions according to the multiple combinations of control parameters, detecting and recording multiple traveling data of the vehicle.

2. The method according to claim 1, after the determining multiple dynamic parameters of the vehicle according to the multiple traveling data, the method further comprises:
    calibrating a vehicle dynamic model of the vehicle according to the multiple dynamic parameters.

3. The method according to claim 1, wherein the traveling data comprises at least one of the following:
    driving speed of the vehicle, steering wheel angle of the vehicle, location information of the vehicle, temperature data of the vehicle, and tire data of the vehicle.

4. The method according to claim 3, wherein the detecting traveling data of the vehicle comprises:
    receiving data transmitted from different types of sensors that are set on the vehicle to obtain the traveling data.

5. Apparatus for testing multiple dynamic parameters of a vehicle under various and different working conditions during developing and testing of a full vehicle, comprising:
    a processors; and
    a memory for storing an instruction executable by the processor;
    wherein the processor is configured to:
    obtain multiple control parameters for an autonomous vehicle, wherein the multiple control parameters comprise a dynamic control parameter, a direction control parameter, and a brake control parameter, and wherein the dynamic control parameter comprises an engine revolution, a transmission gear, and a current engine output torque, the direction control parameter comprises a steering wheel angle, a steering wheel rotation speed, and a steering wheel rotation acceleration, and the brake control parameter comprises a braking time, and a braking force;
    control the vehicle to travel under various kinds of test conditions according to the multiple control parameters, and detect and record multiple traveling data of the vehicle; and
    determine multiple dynamic parameters of the vehicle according to the multiple traveling data;
    wherein the processor is further configured to obtain multiple combinations of control parameters according to the multiple control parameters for the autonomous vehicle, wherein the multiple combinations of control parameters comprises a combination of the direction control parameter and the brake control parameter with fixed dynamic control parameter, a combination of the dynamic control parameter and the brake control parameter with fixed direction control parameter, and a combination of the dynamic control parameter and the direction control parameter with fixed brake control parameter;

and wherein the processor is further configured to control the vehicle to travel under multiple given environments according to the multiple combinations of control parameters, detecting and recording multiple traveling data of the vehicle.

6. The apparatus according to claim 5, the processor is further configured to:
calibrate a vehicle dynamic model of the vehicle according to the multiple dynamic parameters.

7. The apparatus according to claim 5, wherein the traveling data comprises at least one of the following:
driving speed of the vehicle, steering wheel angle of the vehicle, location information of the vehicle, temperature data of the vehicle, and tire data of the vehicle.

8. The apparatus according to claim 7, wherein the processor is further configured to:
receive data transmitted from different types of sensors that are set on the vehicle to obtain the traveling data.

9. A vehicle, comprising the apparatus for testing multiple dynamic parameters of the vehicle according to claim 5.

10. A computer readable storage medium, wherein the computer readable storage medium has a computer program stored thereon, when the program is executed by a processor, the processor is caused to implement the following steps in a method for determining multiple parameters of a vehicle under various and different working conditions during developing and testing of a full vehicle:
obtaining multiple control parameters for an autonomous vehicle, wherein the multiple control parameters comprise a dynamic control parameter, a direction control parameter, and a brake control parameter, and wherein the dynamic control parameter comprises an engine revolution, a transmission gear, and a current engine output torque, the direction control parameter comprises a steering wheel angle, a steering wheel rotation speed, and a steering wheel rotation acceleration, and the brake control parameter comprises a braking time, and a braking force;

controlling the vehicle to travel under various kinds of test conditions according to the multiple control parameters, detecting and recording multiple traveling data of the vehicle; and determining multiple dynamic parameters of the vehicle according to the multiple traveling data;

wherein the obtaining multiple control parameters for an autonomous vehicle comprises:
obtaining multiple combinations of control parameters according to the multiple control parameters for the autonomous vehicle, wherein the multiple combinations of control parameters comprises a combination of the direction control parameter and the brake control parameter with fixed dynamic control parameter, a combination of the dynamic control parameter and the brake control parameter with fixed direction control parameter, and a combination of the dynamic control parameter and the direction control parameter with fixed brake control parameter;

wherein the controlling the vehicle to travel under various kinds of test conditions according to the multiple control parameters, detecting and recording multiple traveling data of the vehicle comprises:
controlling the vehicle to travel under various kinds of test conditions according to the multiple combinations of control parameters, detecting and recording multiple traveling data of the vehicle.

11. The computer readable storage medium according to claim 10, wherein after the determining multiple dynamic parameters of the vehicle according to the multiple traveling data, the processor is further configured to:
calibrating a vehicle dynamic model of the vehicle according to the multiple dynamic parameters.

12. The computer readable storage medium according to claim 10, wherein the traveling data comprises at least one of the following:
driving speed of the vehicle, steering wheel angle of the vehicle, location information of the vehicle, temperature data of the vehicle, and tire data of the vehicle.

13. The computer readable storage medium according to claim 12, wherein the detecting traveling data of the vehicle comprises:
receiving data transmitted from different types of sensors that are set on the vehicle to obtain the traveling data.

* * * * *